Aug. 25, 1970 F. H. KEEN 3,525,471

PUNCHING APPARATUS

Filed July 24, 1968

INVENTOR
Francis Harold Keen
BY Hane and Baxley
ATTORNEYS

United States Patent Office 3,525,471
Patented Aug. 25, 1970

3,525,471

PUNCHING APPARATUS

Francis Harold Keen, Letchworth, England, assignor to International Computers and Tabulators Limited, London, England, a British company Filed July 24, 1968, Ser. No. 747,152
Claims priority, application Great Britain, Aug. 12, 1967, 37,130/67
Int. Cl. G06k *1/05*
U.S. Cl. 234—56 5 Claims

ABSTRACT OF THE DISCLOSURE

A record punching apparatus is disclosed which includes a line of punch mechanisms arranged at an oblique angle to the direction of movement of a record along a track. Data to be represented as perforations in the record is stored in a core storage device while a scan control means is employed to read out data from storage when an appropriate record position passes a punch mechanism. The punches are operated in response to such output data signals and in synchronism with record movement to record information in columnar positions on the record. In another embodiment, two data stores are operated to simultaneously read out data signals and thereby energise punch mechanisms in an overlapping manner.

BACKGROUND OF THE INVENTION

The present apparatus relates to a punching apparatus and in particular, to an apparatus for recording items of data in records by means of perforations arranged in predetemined columns. Data stored in an appropriate storage device is employed to control the energisation of a plurality of punch knife elements, thereby representing data stored as perforations on a record.

It has previously been proposed to record data items as perforations in predetermined columns in a record, a data item being represented in coded form by one or more perforations in a column. For this purpose it is customary to move a record along a track column-by-column and to provide a row of punches across and at right angles to the track. Appropriate ones of the punches are operated for each columnar movement of the record so that all the perforations required in a single column are punched simultaneously.

The positions in which perforations may be made in a column are predetermined so that the spacing between adjacent punches of the row corresponds to the predetermined spacing at which the perforations of a column may occur. While the conventional spacing of the punches provides adequate room for the manual operation of punches in a keyboard-operated punch it has been found that for remotely controlled punches to be driven by, for example, the data outputs of a computer it has been necessary to provide mechanical linkages from the driving mechanisms to the actual punch knives in order to maintain the required spacing of the knives. As the required speeds of punching has been increased to cope with modern data processing equipment speeds it has become evident that such mechanical linkages are increasingly inefficient and undesirable.

According to the present invention, a record punching apparatus includes a record moveable along a track and a plurality of punch elements oriented in a line obliquely with respect to the direction of movement of the record. The record is provided with a plurality of columns in which information is entered in the form of perforations produced by energisation of the punch elements. Data to be entered on the record in the form of perforations is stored in a first and second storage means, although, as will be presently understood, more than two data storage devices can be employed. Scan control means are employed for reading data out of storage in successive cycles to means for energising the punch elements in accordance with such data. Since each data storage device is capable of storing data to be represented in respective sets of columns, when columns of two sets are simultaneously under punch elements, data from both storage devices is read out with the successive reading cycle of each storage device overlapping a portion of the reading cycle of the other storage device. Thus, the degree of overlap corresponds to the maximum displacement, or the number of columnar positions of the record along the track between first and last punch elements.

It will be seen therefore, that in order to achieve a complete perforation of the record, an overlapping of successive data readout cycles is necessary with the oblique line of punch elements of the present invention. Also, although two data storage devices are described, any desired number of stores may be employed, with each store operable to supply data to a set of columns on a record and each set of columns having a number of columns equal to the number of punch elements. Operation of punch elements is synchronised with the column-by-column movement of the record along the track and data to be represented by perforations on the record may be stored during a single column movement of the record.

The arrangement of the line of punch mechanisms at an oblique angle in this way increases the space between adjacent mechanisms used for producing columnar perforations at the conventional spacing and avoids the necessity to use mechanical linkage referred to above by permitting the operating mechanisms to be provided at punch knife positions. This, in turn, allows an increase in efficiency of operation of the punch knives and permits the practically obtainable working speed of the apparatus to be increased.

BRIEF DESCRIPTION OF THE DRAWING

One embodiment of the invention will now be described with reference to the accompanying drawing in which.

DESCRIPTION OF THE PREFERRED EMBODIMENT

Figure 1:
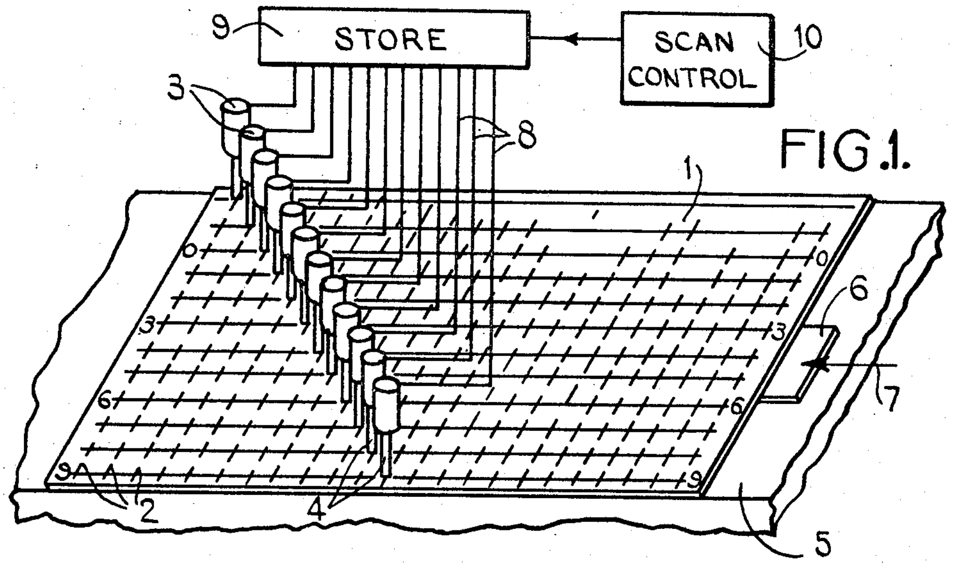
FIG. 1 shows schematically an arrangement of punching mechanisms relative to a record.

Referring now to FIG. 1, a record 1 consists of a card in which items of data may be recorded in columns 2 by means of perforations in predetermined row positions. These positions are spaced apart across the record 1 and twelve such positions are shown. Twelve punch mechanisms 3 are provided, one of each of the row positions, and each mechanism 3 includes a punch knife 4. The record 1 is fed over a bed 5 by means of a follower 6 in the direction of arrow 7, by conventional record card feeding arrangements (not shown), the feeding being arranged in well-known manner to advance the record 1 column-by-column past the punch mechanisms 3 so that each column 2 is presented in turn at each of the mechanisms 3. It will be seen, however, that the punch mechanisms 3 are not aligned in the direction of a single column 2. Instead the mechanisms 3 are arranged in echelon at an oblique angle across the record 1 so that while one mechanism 3 is positioned at one column 2 of the record, an adjacent mechanism 3 is positioned at a different column 2.

Control lines 8 are each associated with a different one of the punch mechanisms 3, each of which is arranged in response to an electrical signal over its associated line 8 to cause its punch knife 4 to move downwards as shown in the figure to produce a perforation in the record 1. The control lines 8 are output lines from a data item storage device 9, and the storage device is read out under control of a store scan control 10. The scan control 10 is arranged to read out the stored data items in series and in synchronism with the passage of the record 1 past the punching mechanism 3 in order to produce output electrical signals over the lines 8. It will be realised that because of the oblique distribution of the punching mechanisms 3 relative to the record columns 2 individual elements of a single data item to be recorded in the same record column 2 are required to be read out of the store 9 at different times. Thus the scan control 10 is arranged to read out each row of the store 9 separately, the timing of the reading of the rows being adjusted in dependence upon the relative columnar spacing of the punching mechanisms 3 to one another.

Figure 2:
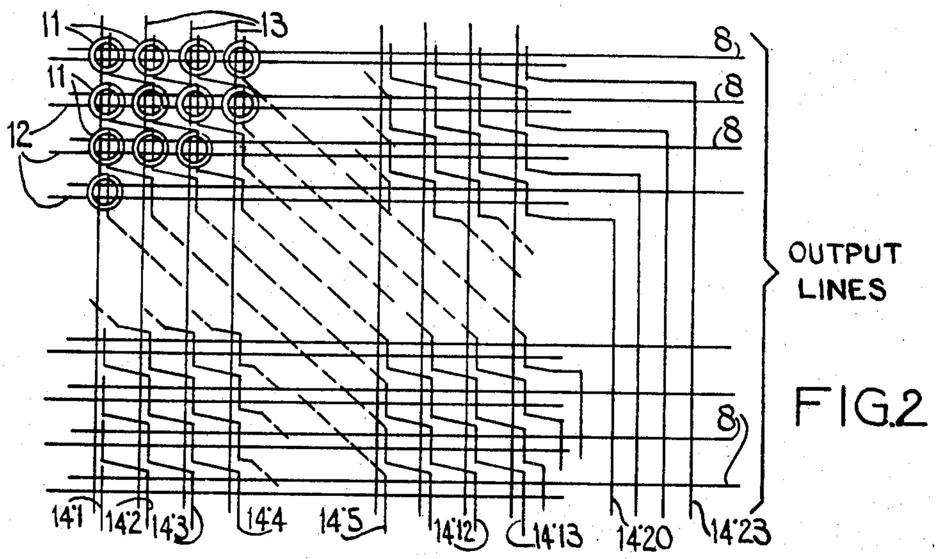
FIG. 2 is a diagrammatic representation of a data storage device.

FIG. 2 shows diagrammatically a storage device and demonstrates a way in which this timing adjustment may be arranged. The storage arrangement shown in FIG. 2 is suitable for the punch mechanism disposition shown in FIG. 1 in which the punch mechanisms 3 are all arranged in a single line with successive mechanisms 3 of the line respectively aligned with succeeding columns 2.

The storage device of FIG. 2 is a core storage device and consists of an array of ferrite storage cores 11 of which, for the sake of clarity, only a small number are indicated diagrammatically. Each core 11 is located at the intersection of a row line 12 and a column line 13. For the purpose of the present explanation twelve row lines 12 are provided, one for each row in which perforations may be made in a record, and the store also has twelve column lines 13, one for each of twelve successive record columns respectively. Data items are entered in coded form into the store columns by the selective energisation of row and column lines 12 and 13, in conventional manner and a data item is represented in one of the store columns by the switching to a predetermined magnetic state of cores situated at the intersection of the particular columns line 13 with those ones of the row lines 12 corresponding to the rows in which a perforation is required in the record 1 (FIG. 1). This form of so-called "card image" store is well known in the art.

In order to read out the store a number of read-out lines 14 (FIG. 2) are provided, the lines being energised in turn in synchronism with the column-by-column movement of the record 1 past the punching mechanisms 3 (FIG. 1). The read-out windings 14 (FIG. 2) are each coupled to one or more of the storage cores 11, and in response to the energisation of a read-out winding 14 all those cores to which the energised winding is coupled are switched to a reset state if they have previously been set. The resetting of a core will cause an electrical signal to be generated in that one of a set of row lines 8 (FIGS. 1 and 2) which is also coupled to the core, so that for any columnar step those lines 8 will be energised according to the presence under the punch mechanisms 3 of positions in the record 1 which are required to be perforated.

For example, let it be assumed that the record 1 is positioned so that the first column 2 is under the lowermost punch mechanism 3 as shown in FIG. 1. While the record is in this position, read-out line 14–1 is energised. The line 14–1 is coupled to only that core 11 at the intersection of the leftmost line 13 and the lowermost line 12 as shown in FIG. 2. Thus if this core is rest, then the lowermost line 8 will be energised to operate the lowermost punch mechanism 3 (FIG. 1). If the record is now advanced by one column, the first record column 2 will be aligned with the next higher punch mechanism 3 and the second column 2 will be aligned with the lowermost mechanism. At this time read-out line 14–2, (FIG. 2), which is coupled to the lowest core 11 of the second store column and the next higher core of the first store column is energised, with the result that if these cores are reset then the lowest two punch mechanisms 3 (FIG. 1) are operated. As the record continues to advance the succeeding lines 14 are energised in turn and the pattern represented by set cores 11 in the store of FIG. 2 is reproduced as a pattern of perforations in the record 1.

It will be seen that the number of cores coupled to succeeding lines 14 increases by one between the lines 14–1 and 14–12. This is, of course, because the number of punch mechanisms 3 aligned with record columns 2 increases in a similar way as the card is advanced through the first 12 columnar spaces. Since the store shown in FIG. 2 has the capacity to store only 12 columns of data, then after the twelfth step, the number of cores 11 coupled to the read-out lines 14 diminishes by one at each step. Thus, on thetwenty-third step when line 14–23 is energised, only the single right-hand topmost core 11 will be interrogated.

It will be appreciated that the completion of reading out the store column by column requires more columnar reading steps than there are storage columns. The number of reading steps actually required will be seen to depend upon the particular configuration of printing mechanisms 3 in relation to the columns of a record 1 (FIG. 1). Thus, if instead of the punch mechanisms 3 being arranged above adjacent columns as shown, they were arranged over alternate columns the total number of read-out cycles would be increased in proportion to the increase in the number of record columns occupied by the array of printing mechanisms 3. Moreover, in this case the pattern of coupling of read-out lines to storage cores would be different from that shown in FIG. 2. For example, the first two steps of interrogation would each involve only a single different core, the third and fourth steps would each involve interrogating two cores and so on.

It will also be appreciated that the punching mechanisms need not be in a single line. For example, instead of being in a single group arranged as shown in FIG. 1 in echelon, the mechanisms 3 could be arranged in two linear groups in chevron in V formation, or in, say, from linear groups arranged in W formation. These changes of formation alter the number of record columns included within the array of mechanisms 3 and in consequence the read-out pattern of the store is altered as is the total number of columnar steps required to completely read-out the store.

Figure 3:
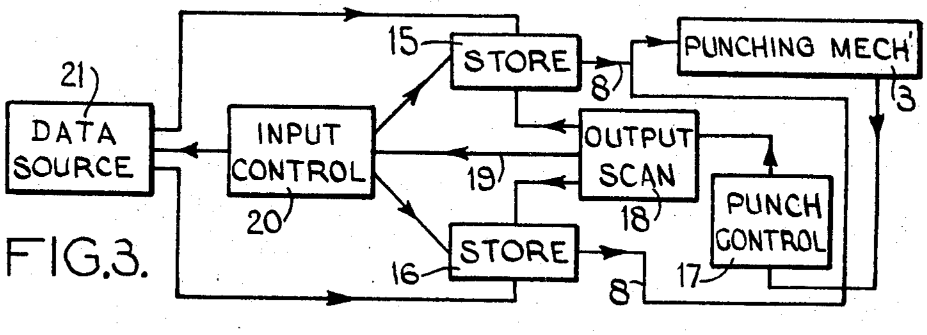
FIG. 3 is a block schematic diagram.

It will be seen from the foregoing discussion that although the storage device shown in FIG. 2 contains only twelve columns of storage, it is possible to arrange for the store to contain any number of columns up to the maximum of columns that may be recorded in a record. However, it is possible to punch a complete record from a number of storage devices, the reading out of the stores being overlapped to ensure that all record columns are completely scanned. For example, FIG. 3 shows an arrangement in block schematic form for using two stores 15 and 16. Each store is a twelve column store similar to that shown in FIG. 2. Let it be assumed that the store 15 contains data items to be punched in columns 1–12 of the record and that the store 16 contains items to be punched in columns 13–24.

Then during reading out of the stores the first twelve steps correspond to the reading steps described with reference to FIG. 2. On the thirteenth step, however, the lowermost punching mechanism 3 (FIG. 1) is at the thirteenth column of the record and an output for this mechanism cannot be sensed from store 15 because, as will be seen in FIG. 2, the read-out line 14–13 is not coupled to any core associated with the lowermost output line 8. On this step, therefore, the read-out line 14–1 of the second store 16 is energised. Thus, on the next steps read-out lines of both stores 15 and 16 are energised. At step twenty-three the read-out of store 15 is completely while the eleventh step of read-out of store 16 is proceeding. At the next, the twenty-fourth, step no read-out from store 15 is needed, so that at this point the store 15 is available to receive a new input of a further twelve data items, and reading out of the store recommences with the energisation of read-out line 14–1 on the twenty-fifth step. In a similar way the store 16 is available to receive a new input at step thirty-six and reading out of store 16 recommences at step thirty-seven. In this way the reading of the two stores 15 and 16 is overlapped and each store is available to receive a new input just before it is required to commence reading out.

Thus, referring now to FIG. 3, the store output lines 8 from both stores are applied in common to the punch mechanisms 3. In the conventional manner, the operation of the punch mechanisms 3 causes the punching apparatus to move the record by one column and the movement of the record produces an indication that it has occurred in a punch control circuit 17. The punch control then causes the selection of a new read-out line configuration in the stores 15 and 16 by an output scan control 18. At the appropriate intervals, when stores are available for a new input, the scan control also applies a signal over a line 19 to a store input control circuit 20 to initiate a writing operation in the store concerned and to permit data items from a data source 21 to be written into the store.

It will be realised that, in the case of the core storage devices described, it is usually possible to load a store completely during a single columnar step of a punching apparatus. However, it is possible to use other forms of storage in conjunction with the punching arrangements described and in this case it is required to provide other interlocks in the conventional manner for reading and writing into the stores so that, for example, the punching operation is arrested until the entry of data items into the store has been completed, to inhibit the entry of data items into storage until the store is in a condition to receive them, to select the cyclic writing and reading of the stores, to inhibit reading if the punching apparatus fails to function or is not loaded with a record. Moreover, it is frequently required to punch particular items of data in a programmed format, and in this case the conventional interlocks for spacing, or re-positioning of a record would be included in the store control and interlocking arrangements.

What is claimed is:

1. A record punching apparatus including means for moving a data record along a path, a line of punch mechanisms arranged at an oblique angle to said path, first and second means for storing data which is to be read represented by perforations in columnar positions on said record, scan control means for reading data out of said first and second storage means in successive read out cycles, means responsive to data read out of said first and second storage means for energising said punch mechanisms in synchronism with the movement of said record along said path, and, wherein portions of the successive readout cycles of said first and second data storage means occur in an overlapping manner, the degree of overlap being equal to the number of record columns spanned by said oblique line of punch mechanisms.

2. An apparatus as claimed in claim 1 in which each punch mechanism is associated with a different columnar position, respectively, and in which the total number of punches in said oblique line is operable to perforate said record in a corresponding number of columns.

3. An apparatus as claimed in claim 2 in which said first data storage means is supplied with data to be represented by perforations in a first set of adjacent columns on said record, said second data storage means is supplied with data to be represented by perforations in a second set of adjacent columns on said record, said second set of columns immediately following said first set on said record, said first and second data storage means operable to supply energising signals to said punch mechanisms when portions of both sets of columns of said record pass said oblique line of punch mechanisms thereby assuring a complete perforation of columns of both sets upon said record movement past said punch mechanisms.

4. An apparatus as claimed in claim 3 in which the number of columns on said record in each set of equal to the number of punch mechanisms in said olique line and in which movement of the record along said track occurs in a column-by-column manner.

5. An apparatus as claimed in claim 1 in which each data store includes a plurality of column and row conductors arranged in a matrix configuration, a ferrite core positioned at the intersection of each column and row conductor, respectively, a plurality of readout conductors, each of said readout conductors coupled to one or more of said cores in an oblique line, means to set said cores by storing information therein, a plurality of output conductors each positioned substantially parallel with a different one of said row conductors, respectively, and each of said output conductors operable to transmit an output signal to an associated punch mechanism upon energisation of a readout conductor and upon an associated core element having been set by information stored therein.

References Cited

UNITED STATES PATENTS

| | | | |
|---|---|---|---|
| 2,708,267 | 5/1955 | Weidenhammer | 234—56 X |
| 3,140,822 | 7/1964 | Hergert | 234—56 X |
| 3,302,874 | 2/1967 | Gruber | 234—110 X |

WILLIAM S. LAWSON, Primary Examiner

U.S. Cl. X.R.

234—108, 131